United States Patent
Laur et al.

(10) Patent No.: US 10,924,013 B1
(45) Date of Patent: Feb. 16, 2021

(54) VOLTAGE-CONTROLLED OSCILLATOR FOR CURRENT MODE HYSTERETIC MODULATOR

(71) Applicant: Alpha and Omega Semiconductor (Cayman) Ltd., Grand Cayman (KY)

(72) Inventors: Steven P. Laur, Raleigh, NC (US); Rhys Philbrick, Los Gatos, CA (US); Nicholas Archibald, San Francisco, CA (US)

(73) Assignee: Alpha and Omega Semiconductor (Cayman) Ltd., Grand Cayman (KY)

( * ) Notice: Subject to any disclaimer, the term of this patent is extended or adjusted under 35 U.S.C. 154(b) by 0 days.

(21) Appl. No.: 16/676,274

(22) Filed: Nov. 6, 2019

(51) Int. Cl.
*H02M 3/156* (2006.01)
*H02M 3/157* (2006.01)
*H02M 3/158* (2006.01)

(52) U.S. Cl.
CPC ......... *H02M 3/1563* (2013.01); *H02M 3/157* (2013.01); *H02M 3/1584* (2013.01); *H02M 2003/1586* (2013.01)

(58) Field of Classification Search
CPC ............. H02M 3/1563; H02M 3/1584; H02M 2003/1586
See application file for complete search history.

(56) References Cited

U.S. PATENT DOCUMENTS

| | | | | |
|---|---|---|---|---|
| 6,433,527 B1 * | 8/2002 | Izadinia | ............... | H02M 3/1584 323/300 |
| 7,615,982 B1 * | 11/2009 | Guo | .................... | H02M 3/1584 323/271 |
| 8,058,859 B2 * | 11/2011 | Xu | .......... | H02M 3/156 323/284 |
| 8,188,721 B2 * | 5/2012 | Isham | .................... | H02M 3/156 323/282 |
| 8,188,723 B2 * | 5/2012 | Piselli | .............. | H02M 3/33507 323/285 |
| 8,786,377 B2 * | 7/2014 | Houston | ............... | H02M 3/156 323/282 |
| 8,836,307 B2 * | 9/2014 | Wan | ....... | H02M 3/156 323/284 |
| 9,348,345 B2 * | 5/2016 | Lynch | .................... | H02M 3/156 |
| 10,063,143 B1 * | 8/2018 | Fan | ......................... | H01F 41/04 |
| 2007/0001655 A1 * | 1/2007 | Schiff | ................... | H02M 3/158 323/246 |
| 2013/0038312 A1 * | 2/2013 | Wang | .................. | H02M 3/1584 323/288 |
| 2020/0133322 A1 * | 4/2020 | Laur | ................... | H02M 3/1584 |

* cited by examiner

*Primary Examiner* — Thomas J. Hiltunen
(74) *Attorney, Agent, or Firm* — Carmen C. Cook (57) ABSTRACT

A voltage-controlled oscillator (VCO) generates a clock signal in response to an input feedback signal by applying tuning to a control loop error signal related to the input feedback signal and generating the clock signal using a voltage ramp signal that is ground referenced. The VCO includes an input tuning circuit applying tuning to a difference signal to generate a tuned voltage signal, a comparator to compare the tuned voltage signal to the ground-based ramp signal, an one-shot circuit to generate an one-shot signal pulse in response to the ramp signal increasing to the tuned voltage signal. The one-shot signal pulse is the clock signal and is also used to reset the ramp signal. In some embodiments, the voltage-controlled oscillator of the present disclosure is incorporated in a current mode hysteretic modulator.

21 Claims, 9 Drawing Sheets

VOLTAGE-CONTROLLED OSCILLATOR FOR CURRENT MODE HYSTERETIC MODULATOR

FIELD OF THE INVENTION

The invention relates to current mode hysteretic modulators and, in particular, to current mode hysteretic modulators with voltage-controlled oscillator control.

BACKGROUND OF THE INVENTION

Electronic systems incorporating integrated circuits typically employ voltage regulators to convert a main bus voltage from a power source supplying the system to one or more voltages necessary for driving the integrated circuits therein. For example, a 5 volts supply voltage provided to an electronic system may need to be reduced to 1.8 volts to drive an integrated circuit in the electronic system. Embedded systems, such as Internet of Things (IoT) devices, include processors (or microcontrollers) and local memory coupled to components and executing embedded software to perform certain tasks. In practice, the processor power supply is provided by a voltage regulator converting an input voltage from a power source to a voltage value specified for the processor. In some cases, the microcontrollers or processors used in these embedded systems implement mobile voltage positioning to allow the processor to control or select its own operating voltage (Vcc). The processor generates a multi-bit voltage identification code to inform the voltage regulator what the regulator output voltage should be at any instant. In this manner, the processor may dynamically adjust the processor supply voltage (Vcc) based on processor activity to reduce processor power consumption. For example, the processor may adjust the processor supply voltage to maintain a higher processor clock speed at a given power consumption, or the processor may adjust the processor supply voltage to lower power consumption at a given clock frequency.

Switch mode power supplies or switching regulators, also referred to as DC to DC converters, are a type of voltage regulators often used to convert an input supply voltage to a desired output voltage at a voltage level selected for an integrated circuit. In one example, a 12V or 5V supply voltage may be reduced to 1V for supplying an embedded processor. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

The operation of the conventional switching regulator is well known and is generalized as follows. A step down (or buck) switching regulator includes a pair of power switches which are turned on and off to regulate an output voltage to be equal to a reference voltage. More specifically, the power switches are alternately turned on and off to generate a switching output voltage at a switching output node, also referred to as the switch node. The switch node is coupled to an LC filter circuit including an output inductor and an output capacitor to generate an output voltage having substantially constant magnitude. The output voltage can then be used to drive a load.

A wide variety of control methods can be applied to switching regulators. One type of switching regulator control scheme is current mode control where the switching regulator modulates the peak current or the valley current in the output inductor in order to deliver the required energy to the load to maintain the desired output voltage. In current mode control, the inductor or power switch current is sensed and the sensed current is compared to a current loop error signal to control the turning on or off of the high-side power switch.

Some switching regulators employ pulse width modulation (PWM) to control the duty cycle of the power switches. That is, the on-time of power switches may be controlled at a given fixed or variable frequency by adjusting the pulse width. Switching regulators employing PWM control include a PWM controller or modulator to drive a power block including the power switches, the driver circuit for the power switches and the LC filter circuit.

In some cases, the switching regulator is a single phase converter and the PWM controller generates a single phase PWM clock signal to drive a single phase power block. In other cases, the switching regulator is a multi-phase converter and a multi-phase PWM controller generates clock signals with different phase shifts to drive a multi-phase power block, each clock signal driving a respective power block cell. Multi-phase PWM controllers are desirable when the voltage regulator has to deliver a regulated output voltage with high precision over a wide range of load conditions.

BRIEF DESCRIPTION OF THE DRAWINGS

Various embodiments of the invention are disclosed in the following detailed description and the accompanying drawings.

FIG. 8, which includes

FIG. 9, which includes FIGS. 9A and 9B, illustrates input tuning circuits that can be incorporated into the VCO of the present disclosure in some examples.

DETAILED DESCRIPTION

According to embodiments of the present invention, a voltage-controlled oscillator (VCO) generates a clock signal in response to an input feedback signal by applying tuning to a control loop error signal related to the input feedback signal and generating the clock signal using a voltage ramp signal that is ground referenced. The VCO of the present disclosure provides variable frequency control responsive to the control loop error signal while using a simple circuit design that provides increased signal-to-noise ratio (SNR).

In some embodiments, the voltage-controlled oscillator of the present disclosure is incorporated in a voltage regulator for providing variable frequency PWM control. In one embodiment, the voltage-controlled oscillator of the present disclosure is incorporated in a current mode hysteretic modulator to generate the clock signal for controlling the variable frequency pulse-width modulation (PWM) operation of the modulator. In one example, the VCO generates the clock signal used to initiate the duty cycle or start the on-duration of the PWM signal of the modulator. The voltage-controlled oscillator of the present disclosure enables independent tuning of the frequency of the current loop error signal and improves the frequency response of the current mode hysteretic modulator to load changes.

Figure 1:
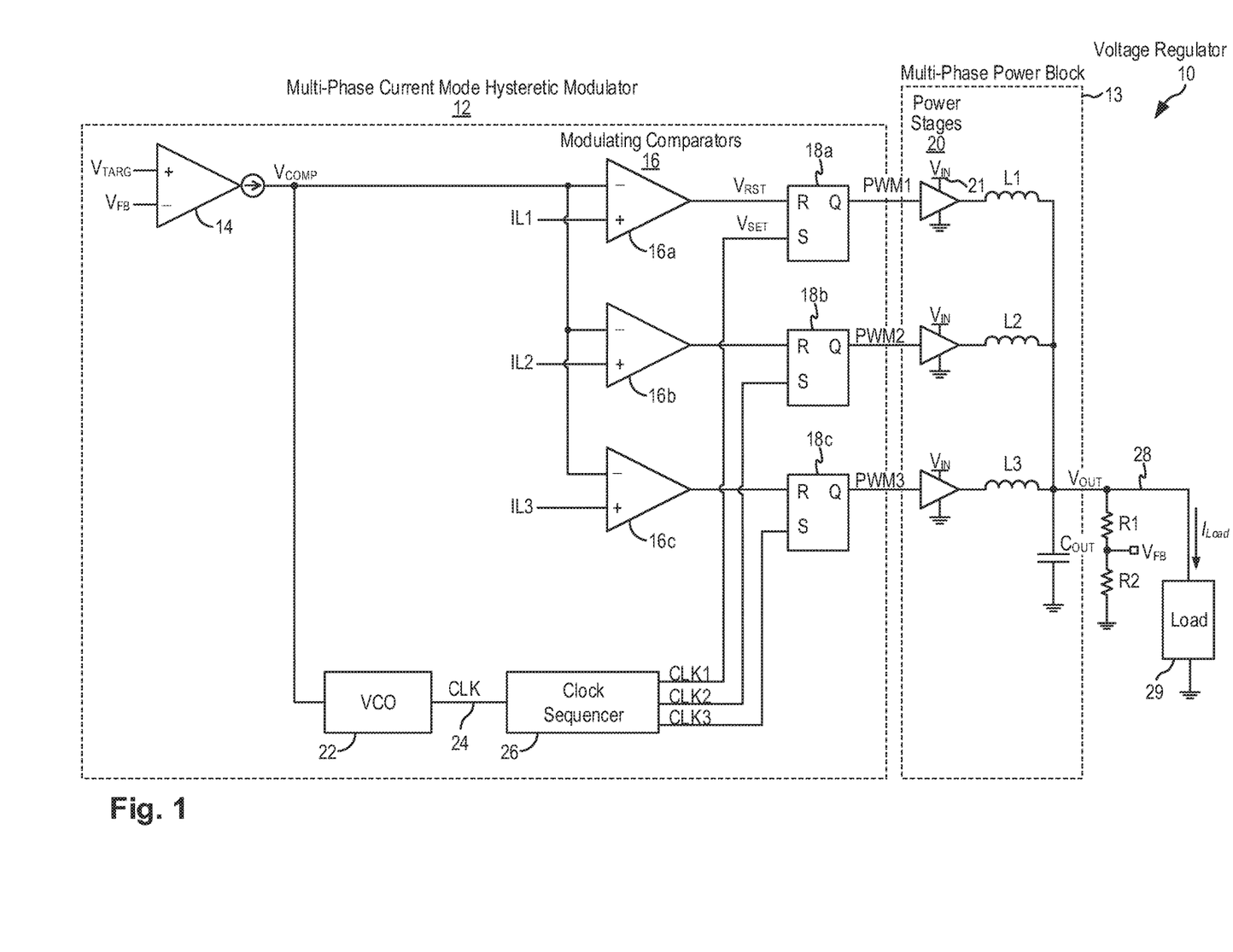
FIG. 1 is a schematic diagram of a voltage regulator incorporating a multi-phase current mode hysteretic modulator in some examples.

FIG. 1 is a schematic diagram of a voltage regulator incorporating a multi-phase current mode hysteretic modulator in some examples. Referring to FIG. 1, a voltage regulator 10 includes a multi-phase current mode hysteretic modulator 12 ("modulator 12") coupled to drive a multi-phase power block 13. In the present example, the voltage regulator 10 is implemented using a multi-phase modulator to enable the voltage regulator to deliver a regulated output voltage with high precision over a wide range of load conditions. The use of a multi-phase modulator is illustrative only and not intended to be limiting. In other examples, the voltage regulator can be implemented using a single phase current mode hysteretic modulator driving a single phase power block. In the present example, the multi-phase modulator 12 includes three phases and the power block 13 includes three power stages 20 with associated output inductors L1 to L3 and an output capacitor $C_{OUT}$.

More specifically, the voltage regulator 10 receives an input voltage VIN on an input node 21 and generates a regulated output voltage $V_{OUT}$ on an output node 28 to supply a load 29. The multi-phase power block 13 includes power stages 20 driven by respective PWM signals PWM1 to PWM3. Each power stage 20 includes a pair of power switches which are turned on and off by the respective PWM signal to regulate the output voltage $V_{OUT}$ with reference to a target voltage. The power switches in each power stage 20 are alternately turned on and off to generate a switching output voltage at a switching output node. The switching output node for each power stage 20 is coupled to respective output inductor L1 to L3. The inductors L1 to L3 are coupled to the output capacitor $C_{OUT}$ to form an LC circuit for providing current to the output node 28 while maintaining a substantially constant output voltage $V_{OUT}$. The output voltage $V_{OUT}$ can then be used to drive the load 29.

The current mode hysteretic modulator 12 receives a feedback voltage $V_{FB}$ indicative of the regulated output voltage $V_{OUT}$ on output node 28. In one example, the feedback voltage $V_{FB}$ is a stepped down voltage of the output voltage $V_{OUT}$. For example, the feedback voltage $V_{FB}$ can be generated using a resistor divider including resistors R1 and R2 coupled to the output voltage node 28. The current mode hysteretic modulator 12 also receives a target voltage $V_{TARG}$ indicative of the voltage value desired for the regulated output voltage. In some examples, the target voltage may be indicated by a voltage identification code signaling the desired regulator output voltage. For instance, when applied in mobile voltage positioning, the modulator 12 may receive a voltage identification (VID) code that tells the modulator what output voltage it should provide. Each VID code is associated with a voltage value. A decoder decodes the code to generate the target voltage.

At the modulator 12, the feedback voltage $V_{FB}$ is compared to the target voltage $V_{TARG}$ at an error amplifier 14 to generate a control loop error signal $V_{COMP}$. The error signal $V_{COMP}$ can be a voltage signal or a current signal. In the present example, the error signal $V_{COMP}$ is a current signal. The error signal $V_{COMP}$ is provided to the inverting input terminals of a set of modulating comparators 16a-c, each modulating comparator corresponding to one phase of the multi-phase control loop. In the present example, each modulating comparator 16 receives a sensed current signal from the respective power stage 20 at the non-inverting input terminal. The sensed current signal ILn is indicative of the inductor current at the respective power stages 20. For example, the first modulating comparator 16a receives a sensed current IL1 at the non-inverting input terminal where the sensed current IL1 is indicative of the current flowing through output inductor L1.

The modulator comparators 16a-c generate the reset voltage signal $V_{RST}$ coupled to the Reset input terminal of the respective latch circuits 18a-c. In the present embodiment, the latch circuits 18a-c are flip-flops. The Set input terminals of the latch circuits 18a-c receive a set voltage signal $V_{SET}$ being a clock signal CLK1 to CLK3 having the respective phase. The latch circuits 18a-c generate the multi-phase PWM signals PWM1 to PWM3 to drive the respective power stages 20 in the multi-phase power block 13.

A voltage-controlled oscillator (VCO) 22 receives the control loop error signal $V_{COMP}$ and generates a clock signal CLK (node 24) in response to changes in the error signal. In the multi-phase modulator 12, the clock signal CLK is provided to a clock sequencer 26 to separate into multiple clock signals CLK1 to CLK3 having different phases. The VCO 22 operates to provide variable switching frequency control in modulator 12 to enable the voltage regulator to be more responsive to load changes.

Figure 2:
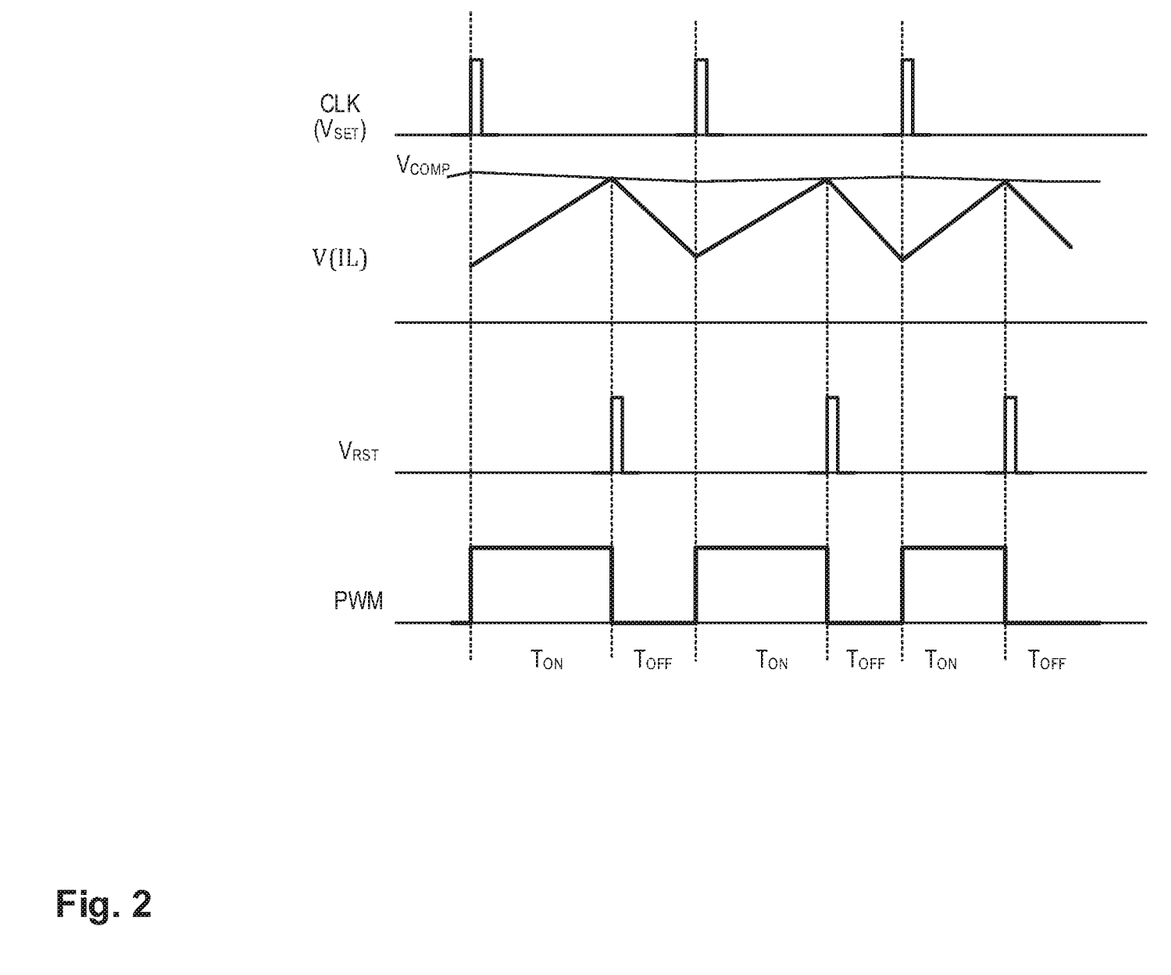
FIG. 2 illustrates the operating signals in a current mode hysteretic modulator in some examples.

As thus constructed, the current mode hysteretic modulator 12 implements a voltage control loop through the feedback voltage $V_{FB}$ and a current control loop through the sensed current signal ILn. The operation of the modulator 12 to generate the PWM signals PWM1-3 is described with reference to FIG. 2. FIG. 2 illustrates the operating signals in a current mode hysteretic modulator in some examples. Referring to FIG. 2, the clock signal CLK is generated in response to error signal $V_{COMP}$. When the clock signal CLK is asserted, the PWM signal starts a new duty cycle. That is, the clock signal CLK, being the set voltage signal $V_{SET}$, triggers the on-duration of the PWM signal. In the present example, the current mode modulator implements peak current control. The sensed current IL is measured and compared against the error signal $V_{COMP}$. When sensed current IL reaches the error signal $V_{COMP}$, the reset voltage signal $V_{RST}$ is triggered which terminates the on-duration of the PWM signal. In this manner, the duty cycle of the PWM signal is controlled by the clock signal CLK and the sensed current signal.

Figures 3, 4:
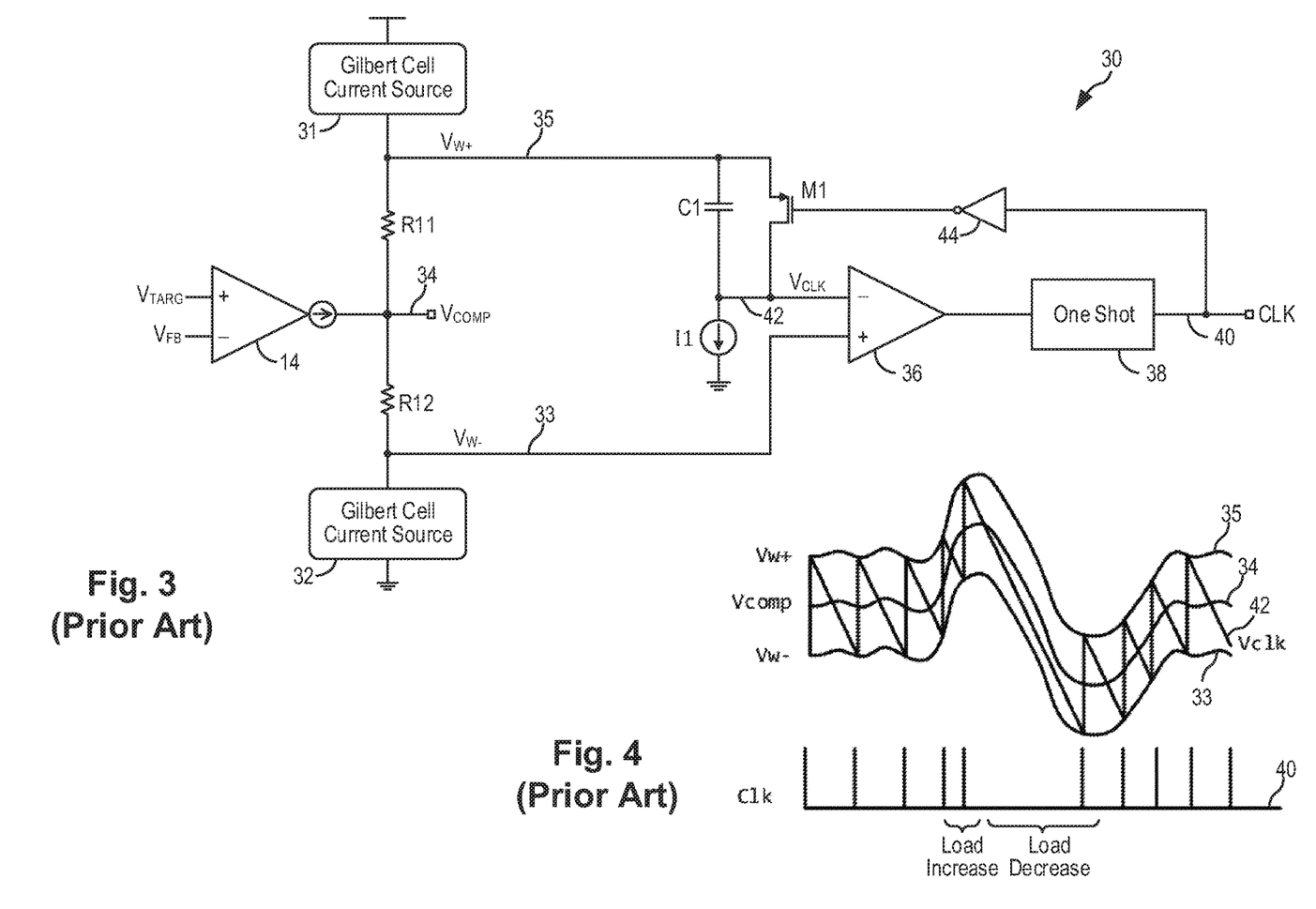
FIG. 3 is a schematic diagram of a conventional voltage-controlled oscillator (VCO) in some examples
FIG. 4 illustrates the operating signals in the conventional VCO in FIG. 3 in some examples.

Conventional voltage-controlled oscillators used in peak current mode hysteretic modulators often utilize complicated voltage windows around the error signal $V_{COMP}$ to establish the desired variable switching frequency operation. FIG. 3 is a schematic diagram of a conventional voltage-controlled oscillator (VCO) in some examples. The operation of the VCO of FIG. 3 is illustrated in the waveform diagram of FIG. 4. Referring to FIGS. 3 and 4, a VCO 30 uses resistors R11 and R12 and Gilbert cell current sources 31, 32 to develop a pair of voltages around the error signal $V_{COMP}$. The voltages $V_{W+}$ and $V_{W-}$ form a voltage window that tracks the error signal $V_{COMP}$. A ramp signal $V_{CLK}$ (node 42) is generated by a capacitor C1 in series with a current source I1. The ramp signal $V_{CLK}$ is compared to the bottom window voltage $V_{W-}$ at a comparator 36. In operation, when the ramp signal $V_{CLK}$, previously reset, is being discharged by the current source I1 and decreases towards the bottom window voltage $V_{W-}$. When the ramp signal reaches the bottom of the voltage window, the comparator 36 is triggered and the one-shot circuit 38 generates a signal pulse on node 40 as the clock signal CLK. The signal pulse from the one-shot circuit 38 is also coupled to an inverter 44 to drive the control terminal of a switch M1, implemented as a PMOS transistor in the present example. Thus, when the signal pulse from the one-shot circuit 38 is triggered, the switch M1 is closed to short the ramp signal $V_{CLK}$ to the top window voltage $V_{W+}$. The signal pulse from the one-shot circuit 38 is of short duration and the switch M2 returns to open state after the signal pulse is terminated. The ramp signal $V_{CLK}$ is thus reset to the top of the voltage window and will then be discharged by the current source I1.

The VCO 30 has several shortcomings. First, the VCO 30 requires complex "floating" circuitry and signals. For instance, the VCO 30 uses a translinear (Gilbert cell) circuit to properly calculate the window size to achieve the target switching frequency. Second, the ramp signal $V_{CLK}$ is a "floating" signal that varies between the bottom window voltage $V_{W-}$ and the top window voltage $V_{W+}$. Also, the signal level available for the excursion of the ramp signal is limited to the window voltage. The VCO thus has limited signal-to-noise ratio.

Third, the voltage window, which tracks the error signal $V_{COMP}$, is used to build the variable frequency clock signal CLK. However, the variable frequency of the clock signal is dependent on the error signal $V_{COMP}$ which can lead to certain undesirable operation results. For example, as shown in FIG. 4, when the load increase and the error signal $V_{COMP}$ moves up, the corresponding clock frequency will increase, as desired. However, if the load increase is followed by a decrease in load demand, then the error signal $V_{COMP}$ will move down and the variable frequency decreases. This result in an over-sampling period during the load increase followed by an under-sampling period in response to the load decrease. This operation regime may not be desirable as the decrease in clock frequency may result in poor regulation of the output voltage.

Figure 5:
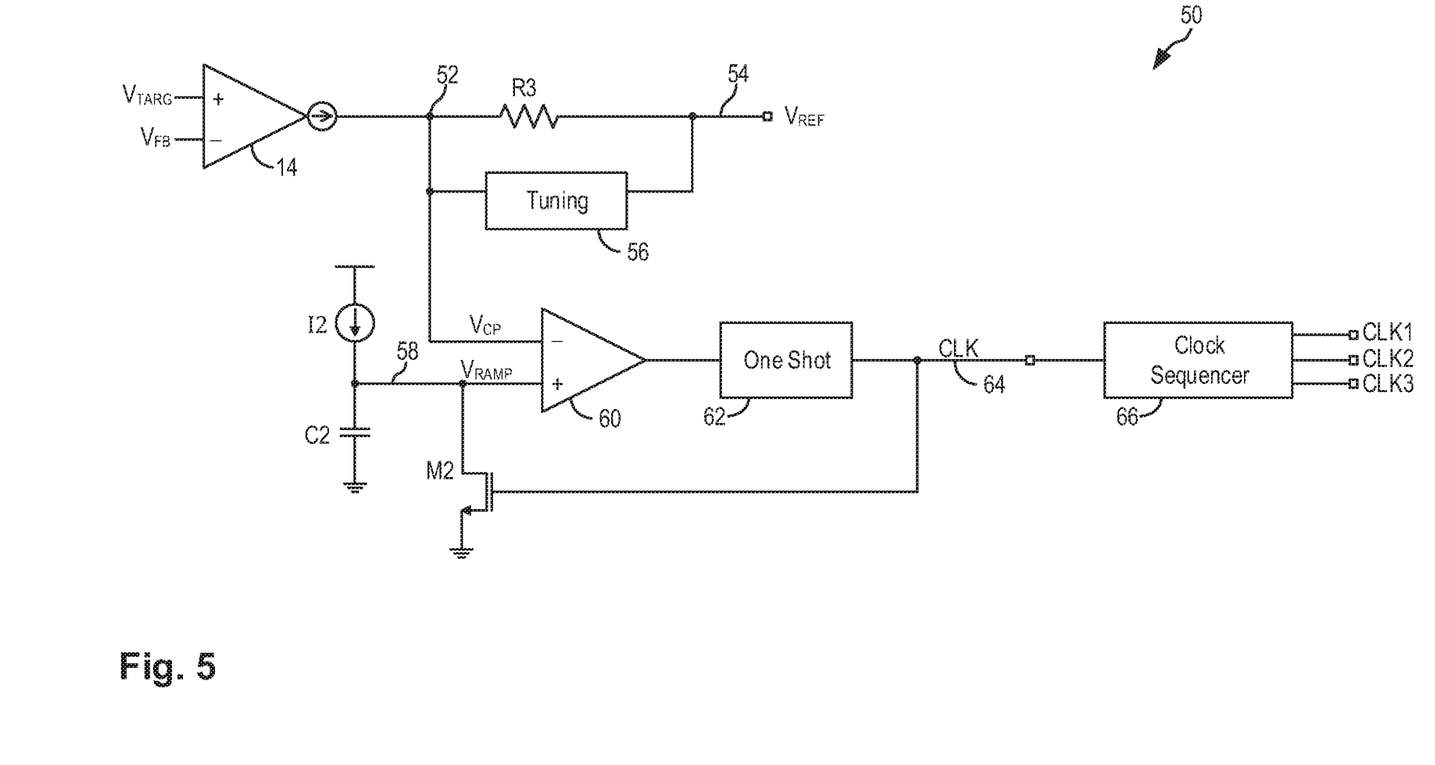
FIG. 5 is a schematic diagram of a voltage-controlled oscillator (VCO) according to embodiments of the present invention.

FIG. 5 is a schematic diagram of a voltage-controlled oscillator (VCO) according to embodiments of the present invention. Referring to FIG. 5, a voltage-controlled oscillator (VCO) 50 generates a variable frequency clock signal by applying tuning to an input error signal and using a ground referenced ramp signal. The VCO 50 receives an input error signal $V_{CP}$ which is indicative of a difference between a feedback voltage and a target voltage. When applied in a current mode hysteretic modulator implementing a voltage regulator, the VCO 50 receives a control loop error signal $V_{CP}$ which is indicative of a difference between the feedback voltage $V_{FB}$ related to the regulated output voltage of the voltage regulator and a target voltage $V_{TARG}$ indicating the desired output voltage for the voltage regulator. The difference between the feedback voltage $V_{FB}$ and the target voltage $V_{TARG}$ is sometimes referred to as a difference signal. The control loop error signal $V_{CP}$ can be generated by an error amplifier 14 and can be a voltage signal or a current signal. In the present embodiment, the error signal $V_{CP}$ is a current signal.

The VCO 50 includes an input tuning circuit formed by resistor R3 and a tuning circuit 56. The input turning circuit receives the control loop error signal $V_{CP}$ at an input node 52. The resistor R3 is coupled between the control loop error signal $V_{CP}$ and a reference voltage $V_{REF}$ (node 54). The tuning circuit 56 is connected in parallel with the resistor R3. In operation, a voltage signal is developed at node 52 as the error signal $V_{CP}$ where the error signal $V_{CP}$ is the difference signal generated by the error amplifier 14 and tuned by tuning circuit 56. In some example, the tuning circuit 56 modifies the frequency response of the difference signal.

The VCO 50 generates a ramp signal $V_{RAMP}$ (node 58) that is ground based or ground referenced. That is, the ramp signal $V_{RAMP}$ starts at the ground voltage and the voltage ramp increases from the ground voltage. In the present embodiment, the ramp signal $V_{RAMP}$ is developed using a ground-based current fed capacitor C2. The capacitor C2 is fed by a current source I2 to develop the voltage ramp at the top plate (node 58) of the capacitor C2.

The ramp signal $V_{RAMP}$ is compared to the error signal $V_{CP}$ at a comparator 60. When the ramp signal $V_{RAMP}$ increases to the error signal $V_{CP}$, the comparator 60 triggers its output and an one-shot circuit 62 is triggered to generate an one-shot signal pulse on the output node 64. The one-shot signal pulse is used as the output clock signal CLK. For example, the output clock signal CLK can be coupled to a clock sequencer 66 to generate multi-phase clock signals CLK1 to CLK3 having different clock phases. Clock sequencer 66 is illustrative only and is not intended to form part of the VCO 50.

The one-shot signal pulse generated by the one-shot circuit 62 is also coupled to the control terminal of a switch M2. The switch M2 is connected between the ramp voltage signal (node 58) and the ground voltage. When the one-shot signal pulse is triggered, the switch M2 is closed and the ramp signal $V_{RAMP}$ (node 58) is shorted to the ground voltage. In this manner, the ramp signal $V_{RAMP}$ is reset to the ground voltage.

In embodiments of the present invention, the tuning circuit 56 may be a passive tuning circuit or an active tuning circuit. The tuning circuit 56 provides non-linear control to adjust or modify the error signal $V_{CP}$. The error signal $V_{CP}$ is indicative of the difference signal but the frequency response of the error signal $V_{CP}$ may be changed to shape the response for the variable frequency control.

Figure 6:
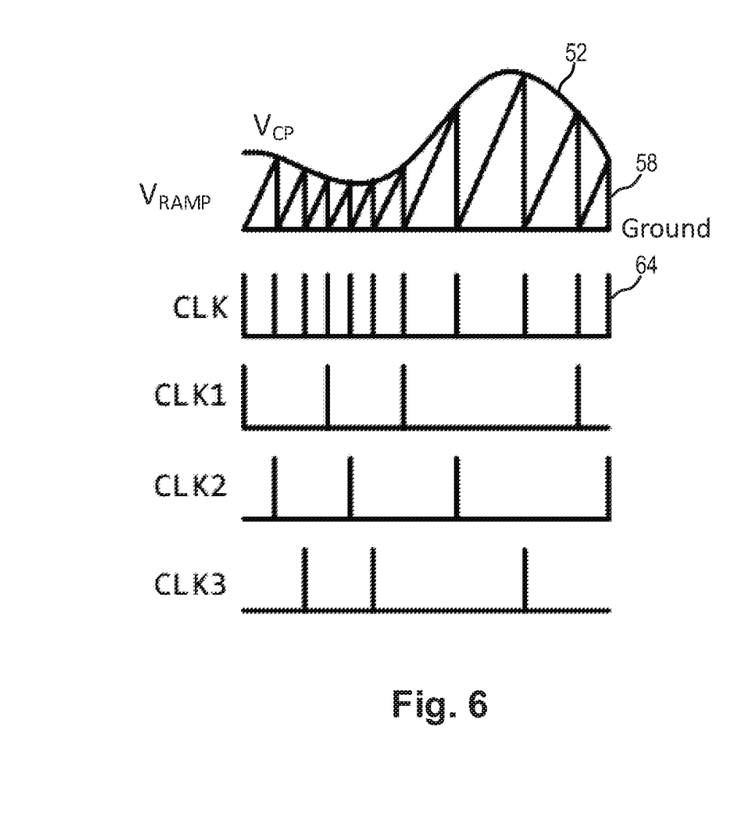
FIG. 6 illustrates the operating signals in the VCO of FIG. 5 in some examples.

In operation, the VCO 50 generates a clock signal when the difference signal based on the difference between the feedback voltage and target voltage, and subtracted from the reference voltage, is equal to the ramp signal $V_{RAMP}$. The operation of the VCO 50 will be described with reference to FIG. 6. FIG. 6 illustrates the operating signals in the VCO of FIG. 5 in some examples. Referring to FIGS. 5 and 6, at the expiration of the last one-shot signal pulse, the clock signal CLK (node 64) is deasserted and the switch M2 is turned off. The ramp signal $V_{RAMP}$ has been reset to the ground voltage and the ramp signal is being charged up by the current source I2 charging the capacitor C2. Meanwhile, the error amplifier 14 generates the difference signal which is tuned by the input tuning circuit to generate the error signal $V_{CP}$ (node 52).

When the ramp signal $V_{RAMP}$ reaches the error signal $V_{CP}$, the comparator 60 is triggered and the one-shot circuit 62 generates a one-shot signal pulse. The clock signal CLK (node 64) is thus generated. At the same time, the one-shot signal pulse is provided to the control terminal of switch M2 to turn on or close the switch. The ramp signal $V_{RAMP}$ (node 58) is thus reset to the ground voltage. At the end of the one-shot signal pulse, the VCO operation continues with the ramp signal being charged up by the current source I2 and the capacitor C2.

As thus operated, when the load demand decreases, the error signal $V_{CP}$ also goes down, the distance for the ramp signal $V_{RAMP}$ to reach the error signal $V_{CP}$ decreases, the ramp signal excursion decreases and the clock frequency increases. Alternately, when the load demand increases, the error signal also increases, the ramp signal $V_{RAMP}$ must travel further to reach the error signal $V_{CP}$ and thus the clock frequency decreases. In embodiments of the present disclosure, the error signal $V_{CP}$ can be tuned to improve the frequency response, such as to extend the oversampling period of the voltage regulator when the load demand changes. For example, when load increases, the VCO 50 can increase the clock frequency (over-sample) for longer time before lowering frequency with load decrease. So when load changes, the voltage regulator can keep oversampling longer during the transition period before changing frequency.

In the case of multi-phase operation, the clock sequencer 66 may be used to distribute the clock pulses of the clock signal CLK into two or more clock signal having different phases. For example, FIG. 6 illustrates distributing of the clock signal CLK into three clock phases CLK1 to CLK3. In this manner, multi-phase clock signals CLK1 to CLK3 can be generated from the clock signal CLK.

Figure 7:
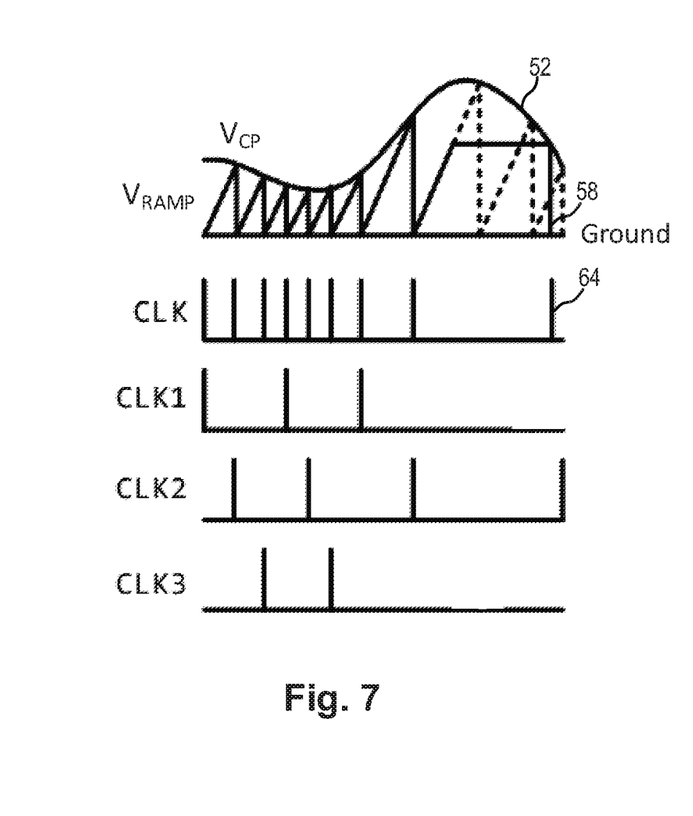
FIG. 7 illustrates the operating signals in the VCO of FIG. 5 in alternate examples.

In embodiments of the present disclosure, the VCO can apply clamping to realize non-linear control of the clock frequency. FIG. 7 illustrates the operating signals in the VCO of FIG. 5 in alternate examples. Referring to FIG. 7, the voltage ramp signal $V_{RAMP}$ can be clamped to reduce the frequency to zero and thus to realize infinite gain. By using clamping, the switching frequency can be stopped for an extended period of time. The clamping can be realized in the VCO 50 of FIG. 5 using various circuit techniques. In some embodiments, as the driving impedance of current source I2 is high, clamping can be achieved by turning off the current source I2. With sufficiently low leakage, the capacitor C2 will hold the last value of the ramp signal $V_{RAMP}$.

Figure 8A:
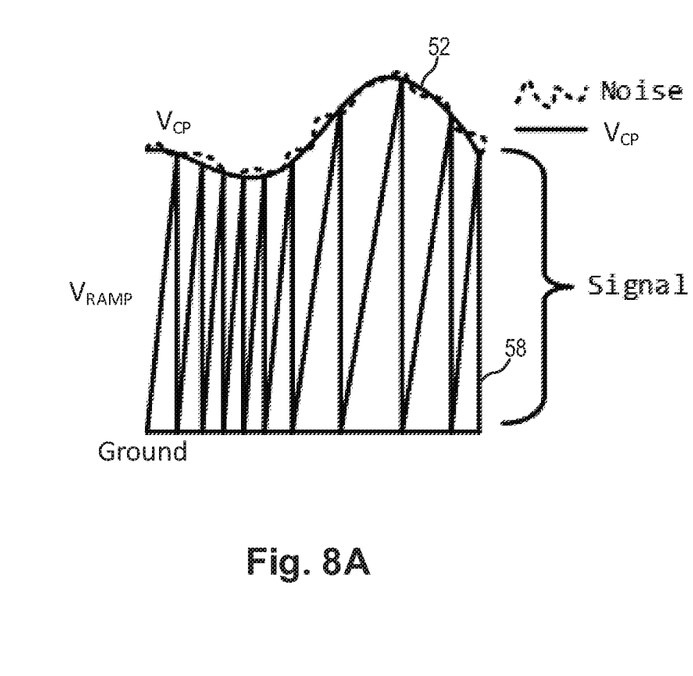
FIGS. 8A and 8B, illustrates the operating signals in the VCO of FIG. 5 and the operating signals in the VCO of FIG. 3, respectively, in some examples.
Figure 8B:
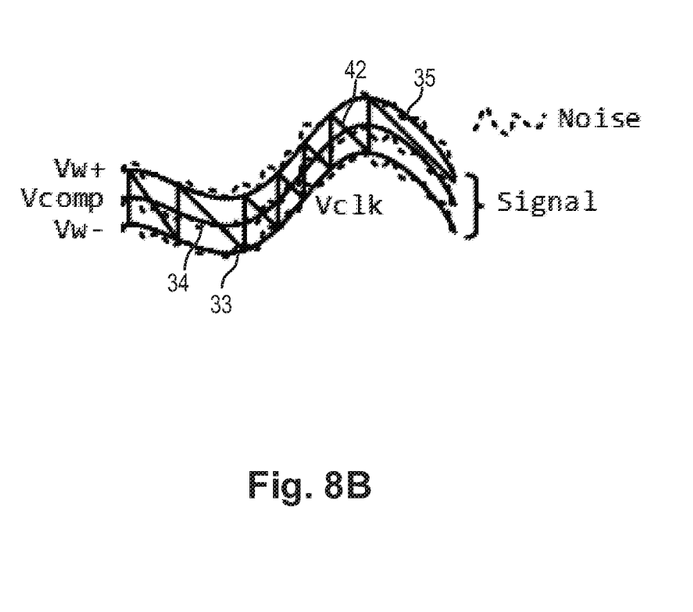

The VCO 50 of the present disclosure realizes many advantages over conventional circuits. First, because the ramp signal $V_{RAMP}$ is ground referenced or ground based, the ramp signal $V_{RAMP}$ can have a large signal excursion which increases signal to noise ratio. FIG. 8, which includes FIGS. 8A and 8B, illustrates the operating signals in the VCO of FIG. 5 and the operating signals in the VCO of FIG. 3 in some examples. Referring to FIG. 8, the ramp signal $V_{RAMP}$ generated by VCO 50 of FIG. 5 has a large signal excursion that is ground referenced (FIG. 8A). To the contrary, the ramp signal $V_{CLK}$ of the conventional VCO 30 of FIG. 3 has limited signal excursion between the two window voltages and the ramp signal is largely floating (FIG. 8B). For example, the ramp signal $V_{RAMP}$ can have a voltage excursion of 0-2V while the error signal $V_{CP}$ can have 20 mV of ripple. The ramp signal $V_{RAMP}$ thus has a larger signal magnitude than the ripple on the error signal $V_{CP}$. With using the ramp signal $V_{RAMP}$, the VCO 50 now has 1% signal to noise ratio (20 mV of 2V). The VCO 50 improves the variable frequency operation by using a ground-based ramp signal. As compared to the conventional VCO 30 (FIG. 8B), the $V_{COMP}$ signal can have a ripple of 20 mV and the voltage window $V_{W+}/N_{W-}$ has a voltage range of 200 mV, resulting in 10% of the signal being noise.

Second, the VCO 50 provides the ability to tune the error signal $V_{CP}$, forming the envelope of the ramp signal in FIG. 8A. In particular, the error signal $V_{CP}$ can be tuned independent of the difference signal.

For example, the tuning circuit can modify the gain and/or the frequency response of the error signal $V_{CP}$. The tuning circuit can be non-linear. Thus, the error signal $V_{CP}$ can be modified to change the response of the error signal. For example, the error signal can be modified to allow for a longer period of time to recover from load changes, can be modified to stay in high clock frequencies longer, or can be modified to allow for longer period of oversampling. The tuning can also be applied to render the error signal $V_{CP}$ to be more sinusoidal or smoother.

More importantly, the error signal tuning and the variable frequency control are separately controlled in VCO 50. Accordingly, independent tuning of harmonic content can be introduced to improve overall system performance. User-programmable tuning can be provided for maximum performance independent of the voltage control loop of the voltage regulator. In the conventional VCOs, the variable frequency control is tied to the error signal. The VCO does not have independent control over the error signal tuning and the variable frequency control.

Third, the VCO 50 of the present invention realizes simplicity of design with tunability and flexibility all improved. The circuit architecture of VCO 50 is largely process agnostic. Furthermore, no translinear circuit is used in VCO 50 of the present disclosure. The frequency calculation is simple arithmetic and pre-designed.

Figures 9, 9B:
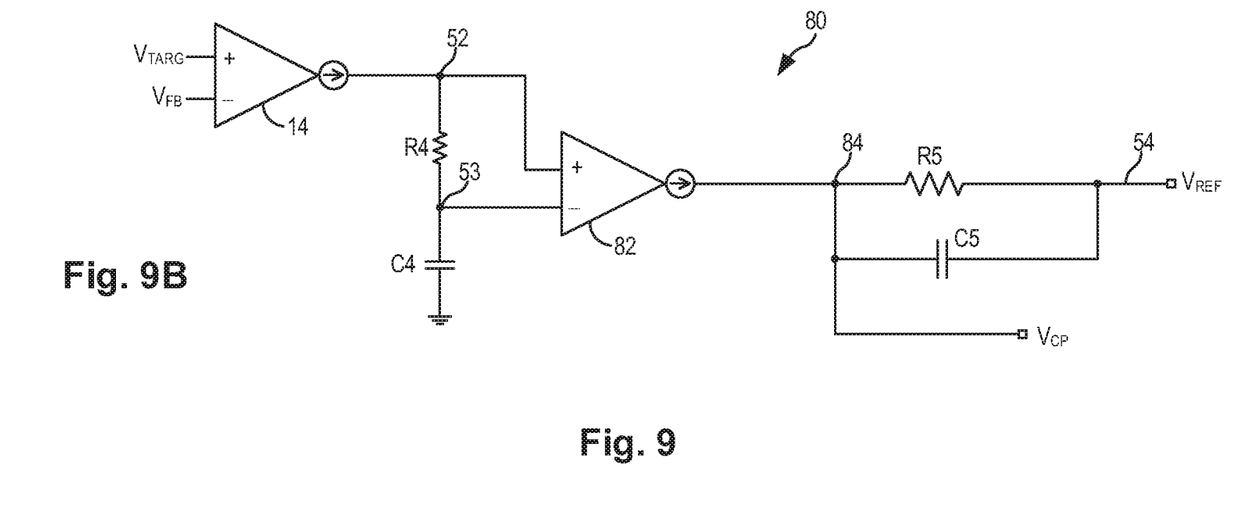
Figure 9A:
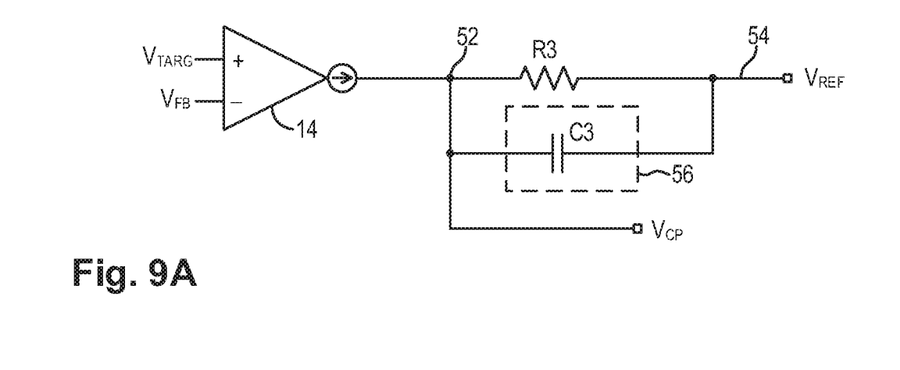

FIG. 9, which includes FIGS. 9A and 9B, illustrates input tuning circuits that can be incorporated into the VCO of the present disclosure in some examples. Referring to FIG. 9A, in one embodiment, the input tuning circuit includes a resistor R3 and a capacitor C3 connected in parallel between the error signal node 52 and a reference voltage $V_{REF}$ (node 54). The capacitor C3 modifies the frequency response of the error signal $V_{CP}$ on node 52.

Referring to FIG. 9B, in one embodiment, an input tuning circuit 80 includes an error amplifier 82. The non-inverting input terminal of the error amplifier 82 is coupled to receive the difference signal (from error amplifier 14) on node 52. A resistor R4 and a capacitor C4 is connected in series between the different signal node 52 and the ground voltage. The common node 53 between resistor R4 and capacitor C4 is coupled to the inverting input terminal of the error amplifier 82. The output of error amplifier 82 is coupled a resistor R5 and a capacitor C5 connected in parallel between the error amplifier output terminal (node 84) and a reference voltage $V_{REF}$ (node 54). The tuned error signal $V_{CP}$ is provided at the error amplifier output terminal (node 84).

Returning to FIG. 5, the one-shot signal pulse has a finite time duration and the ramp signal node 58 is thus held at the ground voltage for the finite, non-zero, time duration. Furthermore, there is a finite amount of time required to discharge capacitor C2 in order to reset the ramp signal node 58. In embodiment of the present disclosure, the VCO of the present disclosure incorporates a dual capacitor circuit to generate the ramp signal $V_{RAMP}$ so as to eliminate the time duration while the ramp signal node is held at the ground voltage. The dual capacitors "ping-pong" to ensure a clean ramp signal node reset and a solid switching frequency in steady-state operation.

Figure 10:
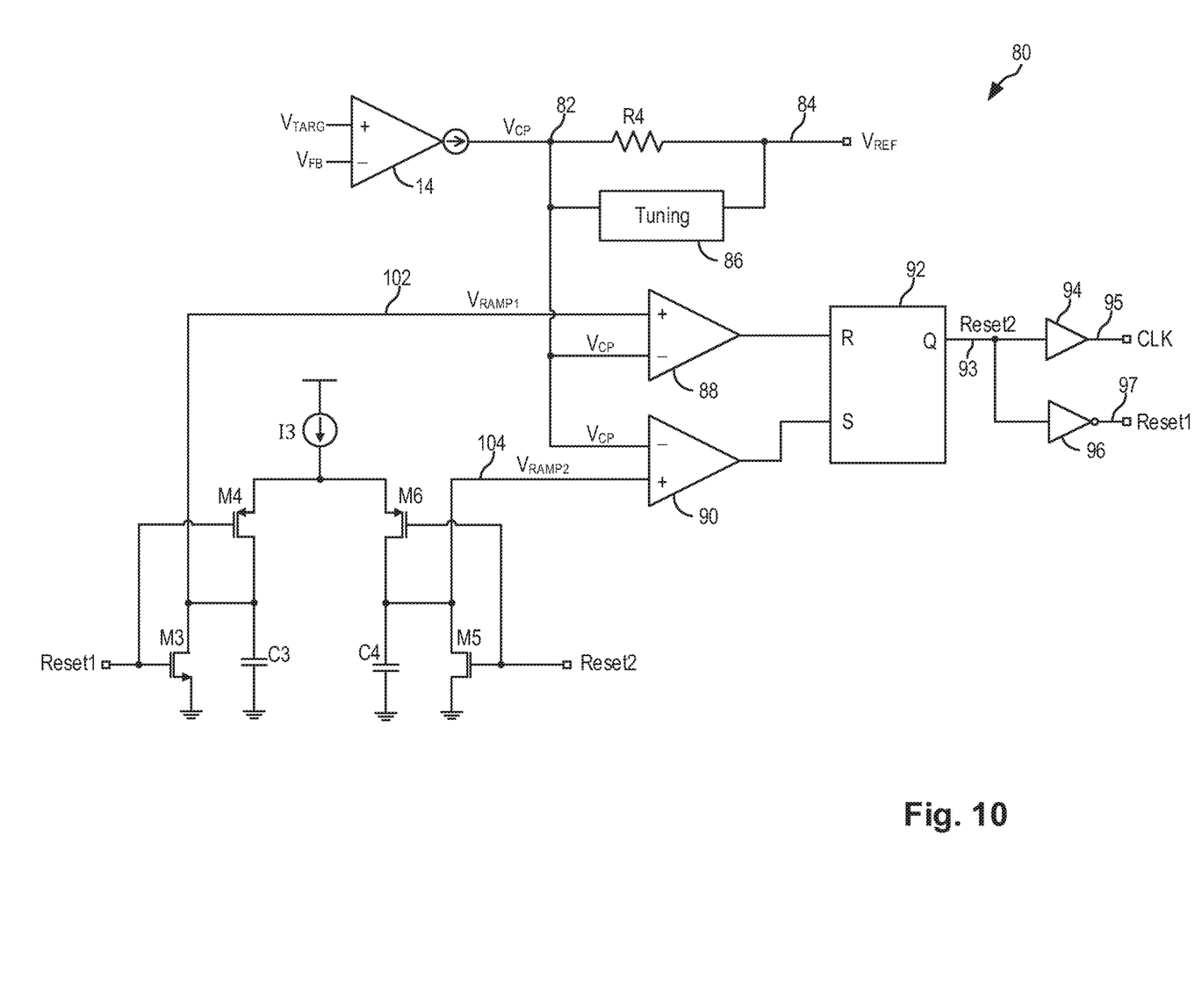
FIG. 10 is a schematic embodiment of a voltage-controlled oscillator (VCO) according to alternate embodiments of the present invention.

FIG. 10 is a schematic embodiment of a voltage-controlled oscillator (VCO) according to alternate embodiments of the present invention. Referring to FIG. 10, a voltage-controlled oscillator (VCO) 80 generates a variable frequency clock signal CLK by applying tuning to an input error signal and using a pair of ground referenced ramp signals.

The VCO 50 receives an input error signal $V_{CP}$ on node 82 which is indicative of a difference between a feedback voltage and a target voltage. The control loop error signal $V_{CP}$ which is indicative of a difference between the feedback voltage $V_{FB}$ related to the regulated output voltage of the voltage regulator and a target voltage $V_{TARG}$ indicating the desired output voltage for the voltage regulator. The difference between the feedback voltage $V_{FB}$ and the target voltage $V_{TARG}$ is sometimes referred to as a difference signal. The control loop error signal $V_{CP}$ is generated by an error amplifier 14 and can be a voltage signal or a current signal. In the present embodiment, the error signal $V_{CP}$ is a current signal.

The VCO 80 includes an input tuning circuit formed by resistor R4 and a tuning circuit 86. The input turning circuit receives the control loop error signal $V_{CP}$ at an input node 82. The resistor R4 is coupled between the control loop error signal $V_{CP}$ and a reference voltage $V_{REF}$ (node 84). The tuning circuit 86 is connected in parallel with the resistor R4. In operation, a voltage signal is developed at node 82 as the error signal $V_{CP}$ where the error signal $V_{CP}$ is the difference signal generated by the error amplifier 14 and tuned by tuning circuit 86. In some example, the tuning circuit 86 modifies the frequency response of the difference signal.

The VCO 80 generates a pair of ramp signals $V_{RAMP1}$ (node 102) and $V_{RAMP2}$ (node 104) that are ground based or ground referenced. That is, both of the ramp signals start at the ground voltage and each voltage ramp increases from the ground voltage. In the present embodiment, the ramp signals are developed using a pair of ground-based current fed capacitors C3 and C4. In particular, the pair of capacitors C3 and C4 are triggered alternately to set and reset a latch 92 to generate the clock signal CLK on output node 95.

The dual capacitor circuit includes the capacitor C3 between charged by a current source I3 through a PMOS transistor M4 and being discharged to ground by an NMOS transistor M3, both transistors M3 and M4 being controlled by a reset signal Reset1. The dual capacitor circuit further includes the capacitor C4 between charged by the current source I3 through a PMOS transistor M6 and being discharged to ground by an NMOS transistor M5, both transistors M5 and M6 being controlled by a reset signal Reset2.

The ramp signal $V_{RAMP1}$ (node 102) is coupled to the non-inverting input terminal of a comparator 88. The ramp signal $V_{RAMP2}$ (node 104) is coupled to the non-inverting input terminal of a comparator 90. The error signal $V_{CP}$ is coupled to the inverting input terminals of both comparators 88 and 90. The output of comparator 88 drives the reset terminal of the latch 92 while the output of comparator 90 drives the set terminal of the latch 92. The output of the latch 92 (node 93) is the reset signal Reset2. The reset signal Reset 2 on node 93 is coupled to a buffer or an non-inverting amplifier 94 to generate the clock signal CLK on the output node 95. The reset signal Reset 2 on node 93 is also coupled to an inverter 96 to generate the reset signal Reset1 on a node 97.

In operation, the ramp signals $V_{RAMP1}$ and $V_{RAMP2}$ are out of phase with each other so that one ramp signal is being charged up while the other ramp signal is being discharged. When one of the ramp signals ramps up to the error signal $V_{CP}$, the respective comparator is triggered and the latch 92 causes the VCO 80 to switch to the other ramp signal that is already discharged and the operation continues with the other ramp signal ramping up to the error signal. The VCO operates in a ping-pong manner, switching between the two capacitors, to eliminate the dead time during the reset of the ramp signal.

Figure 11:
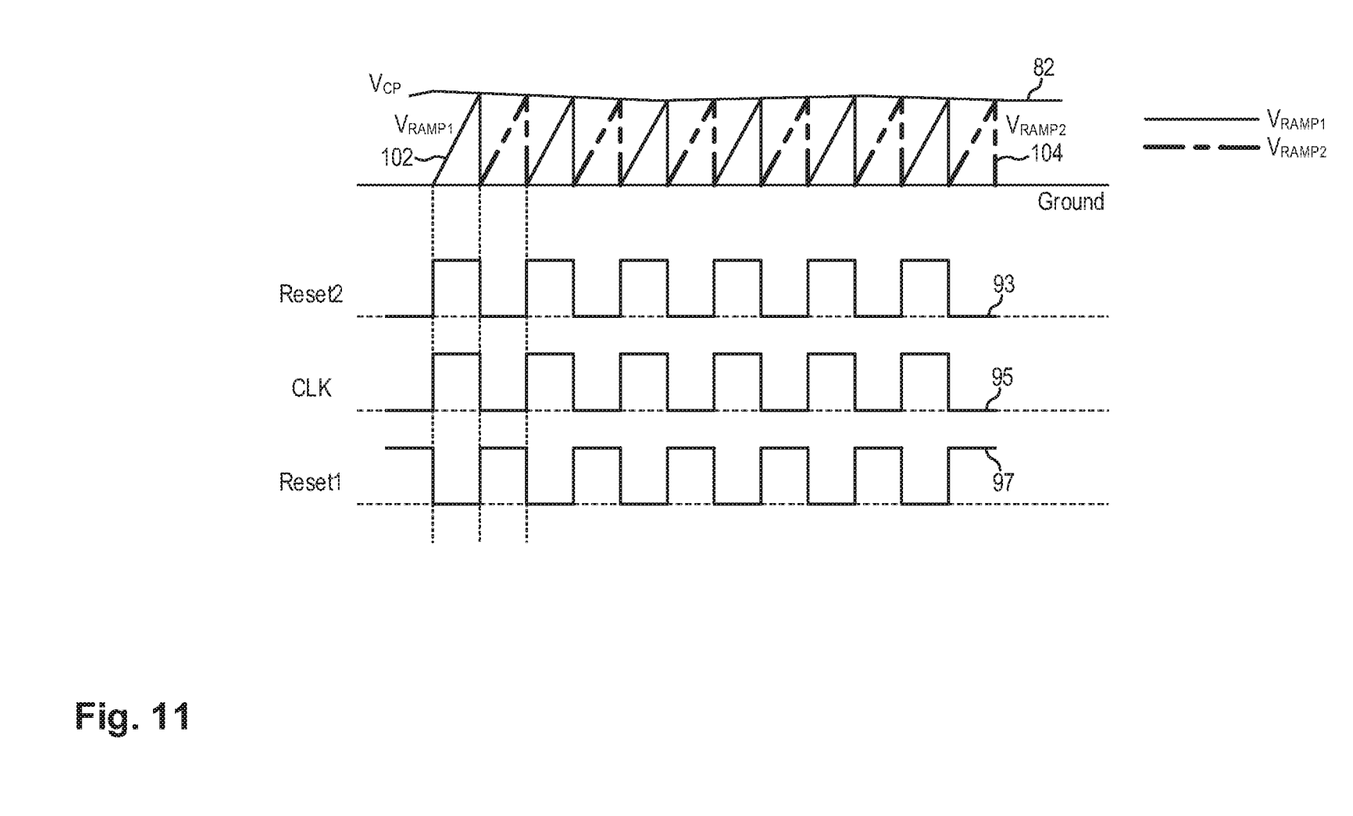
FIG. 11 illustrates the operating signals in the VCO of FIG. 10 in some examples.

The operation of the VCO 80 is illustrated in FIG. 11 in some examples. Referring to both FIGS. 10 and 11, it is assumed the VCO circuit 80 has just generated a clock signal CLK and therefore the reset signal Reset2 and the clock signal CLK are both at a logical high while the reset signal Reset1 is at a logical low. With the reset signal Reset1 deasserted (logical low), the ramp signal $V_{RAMP1}$ ramps up as capacitor C3 is being charged by current source I3. With the reset signal Reset2 asserted (logical high), the ramp signal $V_{RAMP2}$ is being reset as capacitor C4 is being discharged through NMOS transistor M5.

When the ramp signal $V_{RAMP1}$ reaches the error signal $V_{CP}$, the latch 92 is reset and the reset signal Reset2 and the clock signal CLK switch to a logical low while the reset signal Reset1 switches to a logical high. With the reset signal Reset2 deasserted (logical low), the ramp signal $V_{RAMP2}$ ramps up as capacitor C4 is being charged by current source I3. With the reset signal Reset1 asserted (logical high), the ramp signal $V_{RAMP1}$ is being reset as capacitor C3 is being discharged through NMOS transistor M3.

When the ramp signal $V_{RAMP2}$ reaches the error signal $V_{CP}$, the latch 92 is set and the reset signal Reset2 and the clock signal CLK switch to a logical high while the reset signal Reset1 switches to a logical low and the operation continues as described above. As thus configured, the VCO 80 uses two capacitors to ensure a clean reset at each clock cycle and ensures a stable switching frequency.

As described above with reference to FIG. 1, the current mode hysteretic modulator 12 implements a voltage control loop through the feedback voltage $V_{FB}$ and a current control loop through the sensed current signal ILn. In the above description, the current control loop is implemented by receiving a sensed current signal ILn indicative of the inductor current at the respective power stages 20. In other embodiments, the current control loop of the modulator 12 can be implemented using an emulated or synthesized current sense signal. That is, the modulator 12 does not have to receive a sensed inductor current value for the current control loop. Instead, the modulator 12 may use a current loop signal indicative of an expected current level for the current control loop. The exact implementation of the current control loop for the current mode hysteretic modulator 12 is not critical to the practice of the present invention.

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

The invention can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A voltage-controlled oscillator generating an output clock signal in response to an input feedback signal, the voltage-controlled oscillator comprising:
   an input tuning circuit coupled to a first node, the first node being coupled to receive a signal indicative of a difference between the input feedback voltage signal and a target voltage, the input tuning circuit applying tuning to modify at least a frequency response of the signal indicative of the difference to generate a first voltage signal on the first node;
   a comparator having a first input terminal receiving the first voltage signal, a second input terminal receiving a voltage ramp signal having an increasing voltage value from a first voltage value being a ground voltage to a second voltage value, and an output terminal, the comparator generating an output signal on the output terminal having a first state in response to the voltage ramp signal being less than the first voltage signal and having a second state in response to the voltage ramp signal being equal to or more than the first voltage signal; and
   a first logic circuit having an input terminal coupled to the output terminal of the comparator to receive the output signal of the comparator, the first logic circuit generating an output signal having a first state in response to the output signal of the comparator having the second state, the output signal of the first logic circuit being provided as the output clock signal and being applied to reset the voltage ramp signal to the first voltage value.

2. The voltage-controlled oscillator of claim 1, further comprising:
   a first current source and a first capacitor connected in series between a first power supply voltage and the ground voltage, the common node between the first current source and the first capacitor being a second node providing the voltage ramp signal, the first current source supplying a first current to charge the first capacitor to generate the voltage ramp signal having the increasing voltage value from the ground voltage to the second voltage value; and
   a switch coupled between the second node and the ground voltage and being controlled by the output signal of the first logic circuit, the switch being open to allow the first current to charge the first capacitor and to generate the voltage ramp signal at the second node having an increasing voltage value, and the switch being closed in response to the output signal of the first logic circuit to discharge the second node to the ground voltage.

3. The voltage-controlled oscillator of claim 1, wherein the signal indicative of a difference between the input feedback voltage signal and the target voltage comprises a current signal and the input tuning circuit converts the current signal to a voltage signal and tunes the voltage signal by modifying at least the frequency response of the voltage signal.

4. The voltage-controlled oscillator of claim 3, wherein the clock signal has a variable frequency tuned by the input tuning circuit, the variable frequency being independent of the signal indicative of a difference.

5. The voltage-controlled oscillator of claim 3, wherein the input tuning circuit comprises:
   a first resistor coupled between the first node and a reference voltage; the first voltage signal being developed at the first node as a result of the current signal flowing through the first resistor.

6. The voltage-controlled oscillator of claim 5, wherein the input tuning circuit further comprises:
   a second capacitor coupled in parallel with the first resistor, the second capacitor having a first plate coupled to the first node and a second plate coupled to the reference voltage, the second capacitor modifying the frequency response of the first voltage signal at the first node.

7. The voltage-controlled oscillator of claim 3, wherein the input tuning circuit comprises:
   a second resistor and a third capacitor connected in series between the first node and the ground voltage;
   a first error amplifier having a first input terminal coupled to the first node, a second input terminal coupled to a common node between the second resistor and the third capacitor, and an output terminal being a third node and providing an output signal;
   a third resistor coupled between the third node and a reference voltage; and
   a fourth capacitor coupled in parallel with the third resistor, the fourth capacitor having a first plate coupled to the third node and a second plate coupled to the reference voltage, the fourth capacitor modifying the frequency response of the output signal of the first error amplifier at the third node, wherein the first voltage signal is provided at the third node.

8. The voltage-controlled oscillator of claim 1, wherein the first logic circuit comprises:
   an one-shot circuit having an input terminal coupled to the output terminal of the comparator to receive the output signal of the comparator, the one-shot circuit generating an one-shot signal pulse having a first duration in response to the output signal of the comparator having the second state, the one-shot signal pulse being provided as the output clock signal and being applied to reset the voltage ramp signal to the first voltage value.

9. The voltage-controlled oscillator of claim 1, wherein the comparator comprises a first comparator and the voltage ramp signal comprises a first voltage ramp signal, the voltage-controlled oscillator further comprising:
   a second comparator having a first input terminal receiving the first voltage signal, a second input terminal receiving a second voltage ramp signal having an increasing voltage value from the first voltage value being the ground voltage to the second voltage value, and an output terminal, the first voltage ramp signal and the second voltage ramp signal being out of phase, the second comparator generating an output signal on the output terminal having a first state in response to the second voltage ramp signal being less than the first voltage signal and having a second state in response to the second voltage ramp signal being equal to or more than the first voltage signal; and the first logic circuit comprising a latch circuit having a reset input terminal coupled to receive the output signal of the first comparator, a set input terminal coupled to receive the output signal of the second comparator, and an output terminal generating an output signal being provided as the output clock signal, the output signal being applied to reset the second voltage ramp signal to the first voltage value and an inverse of the output signal being applied to reset the first voltage ramp signal to the first voltage value.

10. A current mode hysteretic modulator generating a pulse width modulation (PWM) signal in response to an input feedback signal, the PWM signal having an on duration defining a duty cycle of the PWM signal, the current mode hysteretic modulator comprising:

a first error amplifier receiving a feedback voltage indicative of the output voltage and a target voltage, the first error amplifier generating a signal indicative of a difference between the feedback voltage signal and the target voltage on an output terminal being a first node;

a modulating comparator having a first input terminal receiving the signal indicative of the difference and a second input terminal receiving a current loop signal indicative of an expected current level, the modulating comparator having an output terminal generating a reset signal to reset the on duration of the PWM signal; and a voltage-controlled oscillator having an input terminal receiving the signal indicative of the difference and an output terminal generating an output clock signal, the output clock signal being a set signal to set the on duration of the PWM signal, wherein the set signal initiates the on duration of the PWM signal and the reset signal terminates the on duration of the PWM signal; and wherein the voltage-controlled oscillator generates a tuned voltage signal based on the signal indicative of the difference and generates a ground-referenced ramp signal, the voltage-controlled oscillator generating the output clock signal by comparing the ground-referenced ramp signal to the tuned voltage signal.

11. The current mode hysteretic modulator of claim 10, wherein the voltage-controlled oscillator comprises:

an input tuning circuit coupled to the first node to receive the signal indicative of a difference between the feedback voltage signal and the target voltage, the input tuning circuit applying tuning to the signal indicative of the difference to generate a tuned voltage signal;

a comparator having a first input terminal receiving the tuned voltage signal, a second input terminal receiving the ground-referenced voltage ramp signal having an increasing voltage value from a first voltage value being a ground voltage to a second voltage value, and an output terminal, the comparator generating an output signal on the output terminal having a first state in response to the voltage ramp signal being less than the tuned voltage signal and having a second state in response to the voltage ramp signal being equal to or more than the tuned voltage signal; and an one-shot circuit having an input terminal coupled to the output terminal of the comparator to receive the output signal of the comparator, the one-shot circuit generating an one-shot signal pulse having a first duration in response to the output signal of the comparator having the second state, the one-shot signal pulse being provided as the output clock signal and being applied to reset the voltage ramp signal to the first voltage value.

12. The current mode hysteretic modulator of claim 11, wherein the voltage-controlled oscillator further comprises:

a first current source and a first capacitor connected in series between a first power supply voltage and the ground voltage, the common node between the first current source and the first capacitor being a second node providing the voltage ramp signal, the first current source supplying a first current to charge the first capacitor to generate the voltage ramp signal having the increasing voltage value from the ground voltage to the second voltage value; and a switch coupled between the second node and the ground voltage and being controlled by the one-shot signal pulse, the switch being open to allow the first current to charge the first capacitor and to generate the voltage ramp signal at the second node having an increasing voltage value, and the switch being closed in response to the one-shot signal pulse to discharge the second node to the ground voltage.

13. The current mode hysteretic modulator of claim 11, wherein the signal indicative of a difference between the input feedback voltage signal and the target voltage comprises a current signal and the input tuning circuit converts the current signal to a voltage signal and tunes the voltage signal by modifying at least a frequency response of the voltage signal.

14. The current mode hysteretic modulator of claim 11, wherein the voltage-controlled oscillator further comprises:

a first resistor and a second capacitor connected in parallel and coupled between the first node and a reference voltage, the tuned voltage signal being generated at the first node as a result of the current signal flowing through the first resistor and the second capacitor modifying the frequency response.

15. The current mode hysteretic modulator of claim 11, wherein the voltage-controlled oscillator further comprises:

a second resistor and a third capacitor connected in series between the first node and the ground voltage;

a first error amplifier having a first input terminal coupled to the first node, a second input terminal coupled to a common node between the second resistor and the third capacitor, and an output terminal being a third node and providing an output signal;

a third resistor coupled between the third node and a reference voltage; and a fourth capacitor coupled in parallel with the third resistor, the fourth capacitor having a first plate coupled to the third node and a second plate coupled to the reference voltage, the fourth capacitor modifying the frequency response of the output signal of the first error amplifier at the third node, wherein the tuned voltage signal is provided at the third node.

16. The current mode hysteretic modulator of claim 11, wherein the voltage-controlled oscillator further comprises:

an input tuning circuit coupled to the first node to receive the signal indicative of a difference between the feedback voltage signal and the target voltage, the input tuning circuit applying tuning to the signal indicative of the difference to generate a tuned voltage signal;

a first comparator having a first input terminal receiving the tuned voltage signal, a second input terminal receiving a first ground-referenced voltage ramp signal having an increasing voltage value from a first voltage value being a ground voltage to a second voltage value, and an output terminal, the first comparator generating an output signal on the output terminal having a first state in response to the first voltage ramp signal being less than the tuned voltage signal and having a second state in response to the first voltage ramp signal being equal to or more than the tuned voltage signal;

a second comparator having a first input terminal receiving the tuned voltage signal, a second input terminal receiving a second ground-referenced voltage ramp signal having an increasing voltage value from a first voltage value being the ground voltage to the second voltage value, and an output terminal, the second comparator generating an output signal on the output terminal having a first state in response to the second voltage ramp signal being less than the tuned voltage signal and having a second state in response to the second voltage ramp signal being equal to or more than the tuned voltage signal; and a latch circuit having a reset input terminal coupled to receive the output signal of the first comparator, a set input terminal coupled to receive the output signal of the second comparator, and an output terminal generating an output signal being provided as the output clock signal, the output signal being applied to reset the second voltage ramp signal to the first voltage value and an inverse of the output signal being applied to reset the first voltage ramp signal to the first voltage value.

17. A method of generating a clock signal in response to a voltage feedback signal, the method comprising:

receiving a signal indicative of a difference between the voltage feedback voltage signal and a target voltage;

generating a tuned voltage signal based on the signal indicative of the difference;

generating a voltage ramp signal having an increasing voltage value from a first voltage value being a ground voltage to a second voltage value;

comparing the voltage ramp signal to the tuned voltage signal;

generating a one-shot signal pulse having a first duration in response to the voltage ramp signal being equal to or more than the tuned voltage signal;

resetting the voltage ramp signal in response to the one-shot signal pulse; and providing the one-shot signal pulse as the clock signal.

18. The method of claim 17, wherein generating the tuned voltage signal based on the signal indicative of the difference comprises:

modifying the frequency response of the signal indicative of a difference to generate the tuned voltage signal.

19. The method of claim 17, wherein generating the voltage ramp signal comprises:

coupling a capacitor between a second node and a ground node;

charging the capacitor using a first current, the voltage ramp signal being formed at the second node and being referenced to the ground voltage.

20. The method of claim 19, wherein resetting the voltage ramp signal in response to the one-shot signal pulse comprises:

discharging the capacitor to the ground voltage in response to the one-shot signal pulse.

21. The method of claim 17, wherein the clock signal has a variable frequency as a result of the tuned voltage signal, the variable frequency being independent of the signal indicative of a difference.

* * * * *